United States Patent [19]

Fried et al.

[11] 3,862,915

[45] Jan. 28, 1975

[54] PROCESS FOR AQUEOUS POLYMERIZATION OF N-VINYLPYRROLIDONE UTILIZING FINELY DIVIDED SUSPENSION OF WATER INSOLUBLE CATALYST

[75] Inventors: Micharl Fried, Heidelberg; Rolf Moeller, Ludwigshafen; Ludwig Zuern, Bad Duerkheim; Erhard Stahnecker, Ziegelhausen, all of Germany

[73] Assignee: Badische Anilin-& Soda-Fabrik Aktiengesellschaft, Ludwigshafen (Rhine), Germany

[22] Filed: Apr. 5, 1973

[21] Appl. No.: 348,181

[30] Foreign Application Priority Data

Apr. 19, 1972  Germany............................ 2218935

[52] U.S. Cl.... 260/29.6 HN, 260/88.3 L, 260/80 C, 260/29.6 N, 260/29.6 TA
[51] Int. Cl......... C08f 7/14, C08f 1/08, C08f 19/00
[58] Field of Search ........ 260/29.6 HN, 85.7, 80 M, 260/29.6 WB, 895, 88.3 L

[56] References Cited

UNITED STATES PATENTS

| | | | |
|---|---|---|---|
| 3,166,525 | 1/1965 | Perry............................ | 260/29.6 HN |
| 3,479,327 | 11/1969 | Clark et al......................... | 260/85.7 |
| 3,691,125 | 9/1972 | Barabas et al..................... | 260/85.7 |

OTHER PUBLICATIONS

Polymer Processes–C. Schildknecht, Ed., Interscience Publishers, Inc., N.Y., pps. 191–192.

Encyclopedia of Polymer Science & Technology–Vol. 2, pps. 229–230–Vol. 14, pps. 239–251, Interscience.

*Primary Examiner*—Howard E. Schain
*Assistant Examiner*—Peter F. Kulkosky
*Attorney, Agent, or Firm*—Johnston, Keil, Thompson & Shurtleff

[57] ABSTRACT

Solutions of N-vinylpyrrolidone polymers can be prepared with particular advantage by polymerization of N-vinylpyrrolidone in an aqueous medium by adding the polymerization catalyst in portions or continuously to the monomer solution in the form of a finely divided suspension in an aqueous solution of N-vinylpyrrolidone polymer.

7 Claims, No Drawings

PROCESS FOR AQUEOUS POLYMERIZATION OF N-VINYLPYRROLIDONE UTILIZING FINELY DIVIDED SUSPENSION OF WATER INSOLUBLE CATALYST

This invention relates to a process for the production of polymers of N-vinylpyrrolidone.

N-vinylpyrrolidone is known to be capable of being polymerized in aqueous medium in the presence of a free radical forming polymerization catalyst either alone or mixed with one or more other monoolefincally unsaturated monomers. Homopolymers of copolymers are thus obtained whose molecular weights depend to a great extent on the type of polymerization catalyst used. For example if a hydroperoxide is used as the polymerization catalyst a polymer is obtained having a fairly low molecular weight. On the other hand high molecular weight polymers are obtained when water-insoluble polymerization catalysts are used such as particularly azobiscarbonitriles or azobiscarboxamides, for example azobisisobutyronitrile.

These water-insoluble polymerization catalysts may if desired be dissolved in monomeric N-vinylpyrrolidone and the solution diluted to the desired concentration with water, the polymerization catalyst thus separating from the solution in a finely divided form. It is only possible to control such polymerization batches satisfactorily on an industrial scale however by supplying some of the mixture of monomers, polymerization catalyst and water to the polymerization mixture during the polymerization. In this way it is possible to keep the polymerization temperature constant to some extent. Moreover the polymerization catalyst which is continually being used up is replaced in this way.

The polymers obtained in this method of polymerization have a fairly broad molecular weight distribution however and in practice it is very difficult to ensure consistent results, for example constant viscosity.

We have now found that solutions of N-vinylpyrrolidone polymers can be obtained with advantage by polymerization of N-vinylpyrrolidone, if desired mixed with minor amounts of other monoolefinically unsaturated monomers, in aqueous medium in the presence of a polymerization catalyst which forms free radicals by supplying the polymerization catalyst to the aqueous solution of the monomers in a plurality of portions or continuously in the form of a finely divided suspension of a water-insoluble polymerization catalyst forming free radicals in an aqueous solution of the N-vinylpyrrolidone polymer. Mainly water-soluble monoolefinically unsaturated monomers such as α,β-monoolefinically unsaturated monocarboxylic and dicarboxylic acids usually of three to five carbon atoms and/or their amides may be used as comonomers in the new process in minor amounts. Acrylic acid, acrylamide and methacrylamide are preferred as water-soluble comonomers. The amount of water-soluble comonomers of the said type may be up to 50 percent, i.e. from 0 to 50 percent, more often from 0 to 30 percent, preferably up to 20 percent, i.e., from 0 to 20 percent, by weight, based on the whole of the monomers. The proportion of N-vinylpyrrolidone is therefore from 50 to 100 percent, more often from 70 to 100 percent and preferably from 80 to 100 percent by weight. Monoolefinically unsaturated monomers having sparing solubility in water such as acrylonitrile and monoolefinically unsaturated carboxylic esters of 3 to 4 carbon atoms, for example methyl acrylate and vinyl acetate may also be used as comonomers in amounts of up to 30 percent, i.e. from 0 to 30 percent, preferably up to 15 percent, i.e. from 0 to 15 percent, by weight based on the whole of the monomers. Homopolymerization of N-vinylpyrrolidone is of particular interest. The concentration of monomers in the aqueous monomer solution at the beginning of the polymerization is generally from 5 to 30 percent, preferably from 10 to 25 percent, by weight based on the total amount of monomers and water (without catalyst suspension).

Preferred water-insoluble polymerization catalysts which form free radicals are azobiscarbonitriles and/or azobiscarboxamides such as azobisbutyronitrile and/or azobisbutyramide and other suitable catalysts are water-insoluble peroxides such as dicumyl peroxide and tert.-butyl peroctoate. These suitable azobiscarbonitriles and amides are disclosed for example in U.S. Pat. No. 2,471,959 which is incorporated herein by reference. In the production of the finely divided suspension of such polymerization catalysts the catalysts which are generally present in crystalline form are prepared in an aqueous solution of N-vinylpyrrolidone polymers, for example by grinding a suspension of the catalysts in the aqueous polymer solutions. From 0.5 to 50 percent, preferably from 10 to 30 percent, by weight of the polymerization catalyst is generally used, based on the total amount of suspension. The aqueous polymer solution used for the production of the catalyst suspension generally contains from 0.5 to 30 percent, preferably from 5 to 15 percent, by weight of vinylpyrrolidone polymer based on the polymer solution devoid of catalyst. The vinylpyrrolidone polymer preferably has the same composition as the vinylpyrrolidone polymer to be prepared by using the catalyst suspension. Its K value measured in aqueous solution is generally in the range from 60 to 150, preferably from 80 to 120, determined by the method of H. Fikentscher, Cellulosechemie, 13, 58 et seq. (1932). The total amount of polymerization catalyst used in the form of a suspension is within the conventional range, generally from 0.01 to 3 percent, particularly from 0.02 to 1 percent, by weight based on the monomers.

Polymerization in the new process is generally carried out at a temperature of from 60° to 150°, preferably from 60° to 120°C. It is particularly advantageous to heat up the solution of the monomers in the aqueous medium to polymerization temperature, i.e., to a temperature within the range from 60° to 150°C, and only then to meter in the catalyst suspension. The catalyst suspension may be added in the process in a number of batches or continuously. The amount of catalyst supplied is generally chosen so that the polymerization temperature remains constant. This is preferably achieved by supplying from 1 to 30 percent and particularly from 5 to 20 percent of the total amount of catalyst to be used at the beginning of the polymerization and supplying the remainder of the catalyst in one to 10 portions or usually in two to five portions (which may be identical or different in amount) or continuously during the polymerization.

Aqueous solutions of N-vinylpyrrolidone polymers having uniform properties are obtained by the new process. The process has the advantage of better reproducibility of the results than prior art methods for polymerizing N-vinylpyrrolidone in aqueous medium. Moreover the N-vinylpyrrolidone polymers obtained have a fairly narrow molecular weight distribution and the molecular weight of the polymers is easy to regulate and readily reproducible by choice of the polymerization temperature and exact maintenance of the same. Another advantage of the process is that polymerization may be carried out in a single vessel so that for example a reservoir for the monomer solution is unnecessary. The entire duration of the polymerization in the new process may be drastically curtailed by adding catalyst suspension at the end of the polymerization.

The following Examples illustrate the invention. The parts and percentages given in the Examples are by weight.

EXAMPLE 1 a. Catalyst suspension:

10 parts of a 10 percent aqueous solution of a copolymer of 87.5 parts of N-vinylpyrrolidone and 12.5 parts of methyl methacrylate having a K value of 86.8 is placed in a stirred vessel cooled with water and 4 parts of azobisisobutyronitrile is added. The mixture is cooled while being homogenized with an impeller having cutting blades at 1,000 rpm for 30 minutes. A finely divided catalyst suspension is obtained.

b. 6400 parts of water, 1400 parts of N-vinylpyrrolidone, 200 parts of methyl methacrylate and 0.4 part of 25 percent aqueous ammonia are placed in a stirred vessel which is heated to 80°C. Then within 5 minutes 1.6 parts of the catalyst suspension is added. Polymerization begins and subsides after half an hour. After another half an hour another 1.6 parts of catalyst suspension is added, and after another 2 hours 12.8 parts of catalyst suspension is supplied. The polymerization is over after a total of 6 hours. A copolymer solution is obtained having a content of residual monomers of less than 0.1 percent based on the amount of monomers used. The temperature of the polymerization mixture does not deviate by more than 2°C. from 80°C during the polymerization. The 20 percent copolymer solution obtained has a viscosity of from 90 to 100 poises at 20°C. The K value of the copolymer is 86.8.

EXAMPLE 2 a. Catalyst suspension:

12 parts of a 5 percent aqueous solution of a copolymer from 95 parts of N-vinylpyrrolidone and 5 parts of acrylic acid and also 3 parts of azobisisobutyronitrile are placed in a stirred vessel provided with water cooling. The whole is stirred for 30 minutes with an impeller having cutting blades at 1,000 rpm while cooling.

b. 1520 parts of N-vinylpyrrolidone, 80 parts of acrylic acid and 90 parts of 50 percent aqueous caustic soda solution are dissolved in 6,400 parts of water in an autoclave, heated to 100°C and after this temperature has been reached catalyst suspension is metered in continuously at the rate of 0.4 part per hour. The polymerization temperature is kept at 100°C. Polymerization is over after four hours. A 20 percent aqueous solution of a copolymer is obtained which has a K value of 208, a viscosity of 100 to 110 poises and a residual monomer content of less than 0.35 percent.

EXAMPLE 3 a. 30 parts of a 5 percent aqueous solution of a copolymer from 25 parts of vinyl acetate and 75 parts of N-vinylpyrrolidone and also 5 parts of azobisisobutyronitrile are placed in a stirred vessel with water cooling. The whole is stirred for half an hour while cooling, using an impeller having a cutting blade assembly.

b. 6400 parts by volume of water is placed in a stirred vessel and 1200 parts of N-vinylpyrrolidone and 400 parts of vinyl acetate are added. The vessel is tightly closed and heated to 85°C. After this temperature has been reached 20 parts of catalyst suspension is added in portions of 4 parts each spread over 5 hours. After the final addition polymerization is continued for another 2 hours to complete it.

The 20 percent polymer solution obtained has a K value of 96, a viscosity of 105 to 110 poises and a residual monomer content of 0.08 percent.

EXAMPLE 4 a. The catalyst suspension is prepared by suspending 5 parts of azobisisobutyronitrile in 30 parts of a 5 percent aqueous solution of a polymer from 90 parts of N-vinylpyrrolidone and 10 parts of acrylamide.

b. A mixture of 6,400 parts of water, 1440 parts of N-vinylpyrrolidone and 160 parts of acrylamide in polymerized at 85°C by adding 1 part of the catalyst suspension at the beginning, 1 part 50 minutes after the beginning and another 4 parts after another 2 hours. The polymerization is over after 5 hours. A 20 percent solution of polymer is obtained having a K value of 105 and a viscosity of 550 to 600 poises (both measured at 20°C). The content of residual monomers is 0.15 percent.

We claim: by

1. In a process for the production of an aqueous solution of an N-vinylpyrrolidone polymer b y polymerizing as the monomer
   a. from 70 to 100 percent by weight of N-vinylpyrrolidone and
   b. up to 30 percent by weight, based on the total monomer amount, of at least one other monoolefinically unsaturated monomer selected from the group consisting of acrylic acid, acrylamide, methacrylamide, acrylonitrile, methyl acrylate and vinyl acetate, in an aqueous solution at a temperature of from 60° to 150°C. and in the presence of a water-insoluble polymerization catalyst forming free radicals, the improvement which comprises supplying to said aqueous solution of the monomer in a plurality of portions or continuously from 0.01 to 3 percent by weight, based on the total monomer amount of said water-insoluble polymerization catalyst in the form of a finely divided 0.5 to 50 percent by weight suspension in an aqueous 0.5 to 30 percent by weight solution of an N-vinylpyrrolidone polymer having a K value in aqueous solution of from 60 to 150.

2. A process as claimed in claim 1 in which the aqueous solution of the monomer is heated to 60° to 150°C and then the suspension of the polymerization catalyst is introduced.

3. A process for the production of an aqueous solution of poly-N-vinylpyrrolidone by polymerization of N-vinylpyrrolidone in an aqueous solution at a temperature of from 60° to 120° C., which process comprises heating an aqueous solution of N-vinylpyrrolidone to a temperature of from 60° to 120°C. and then supplying continuously from 0.01 to 3 percent by weight (based on the amount of N-vinylpyrrolidone) of a water-insoluble polymerization catalyst forming free radicals in the form of a finely divided 10 to 30 percent by weight suspension in an aqueous 5 to 15 percent by weight solution of a poly-N-vinylpyrrolidone having a K value in aqueous solution of from 80 to 120.

4. A process for the production of an aqueous solution of poly-N-vinylpyrrolidone by polymerizing N-vinylpyrrolidone in an aqueous medium at a temperature of from 60° to 120°C., which process comprises heating an aqueous N-vinylpyrrolidone solution to a temperature of 60° to 120°C. and then supplying 0.01 to 3 percent by weight, based on the amount of N-vinylpyrrolidone, of a water-insoluble polymerization catalyst forming a free radicals in the form of a finely divided 10 to 30 percent by weight suspension in an aqueous 5 to 15 percent by weight solution of poly-N-vinylpyrrolidone having a K value in aqueous solution of from 80 to 120 by first adding from 5 to 20 percent by weight of the total amount of catalyst and then adding the remainder of the polymerization catalyst during the polymerization in one to ten portions to the polymerization mixture.

5. A process as claimed in claim 1 wherein said water-insoluble polymerization catalyst forming free radicals is a compound selected from the class consisting of peroxides, azobiscarbonitriles and azobiscarboxamides.

6. A process as claimed in claim 3 wherein said water-insoluble polymerization catalyst forming free radicals is a compound selected from the class consisting of peroxides, azobiscarbonitriles and azobiscarboxamides.

7. A process as claimed in claim 4 wherein said water-insoluble polymerization catalyst forming free radicals is a compound selected from the class consisting of peroxides, azobiscarbonitriles and azobiscarboxamides.

* * * * *